(12) United States Patent
Rosar (10) Patent No.: US 7,003,727 B2
(45) Date of Patent: Feb. 21, 2006

(54) USER IDENTIFICATION AND PASSWORD FIELD DETERMINATION

(75) Inventor: Bruce Rosar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 09/777,287

(22) Filed: Feb. 6, 2001

(65) Prior Publication Data
US 2002/0105542 A1 Aug. 8, 2002

(51) Int. Cl.
G06F 13/00 (2006.01)
(52) U.S. Cl. .................... 715/741; 715/780
(58) Field of Classification Search ........ 345/740–743, 345/809, 748, 749, 760, 755, 821–824, 860, 345/780; 713/200, 193; 715/780, 809, 741–743, 715/731, 771–773, 965–966; 709/223, 220–222, 709/225, 217; 382/100
See application file for complete search history.

(56) References Cited

U.S. PATENT DOCUMENTS

| | | | | | |
|---|---|---|---|---|---|
| 5,550,968 | A | * | 8/1996 | Miller et al. ............... | 345/743 |
| 5,828,372 | A | * | 10/1998 | Kameda ..................... | 345/741 |
| 5,961,592 | A | * | 10/1999 | Hsia .......................... | 709/217 |
| 6,011,537 | A | * | 1/2000 | Slotznick ................... | 345/740 |
| 6,012,055 | A | * | 1/2000 | Campbell et al. ............. | 707/5 |
| 6,032,151 | A | * | 2/2000 | Arnold et al. ............. | 707/103 R |
| 6,084,585 | A | * | 7/2000 | Kraft et al. ................. | 715/733 |
| 6,122,741 | A | * | 9/2000 | Patterson et al. ........... | 713/200 |
| 6,246,403 | B1 | * | 6/2001 | Tomm ....................... | 715/762 |
| 6,347,329 | B1 | * | 2/2002 | Evans ....................... | 709/202 |
| 6,389,747 | B1 | * | 5/2002 | Chang ..................... | 47/58.1 R |
| 6,567,820 | B1 | * | 5/2003 | Scheifler et al. ............ | 719/315 |
| 6,633,311 | B1 | * | 10/2003 | Douvikas et al. ........... | 715/731 |
| 6,747,676 | B1 | * | 6/2004 | Botz et al. .................. | 715/741 |
| 6,820,136 | B1 | * | 11/2004 | Pham et al. ................ | 709/248 |
| 2004/0255137 | A1 | * | 12/2004 | Ying ......................... | 713/193 |
| 2005/0008189 | A9 | * | 1/2005 | Carr et al. .................. | 382/100 |

OTHER PUBLICATIONS

"Setting up and Using the IBM® Express Logon Feature" © Copyright International Business Machines Corporation 2000, pp. 1 to 125, available at http://www-4.ibm.com/software/network/library/whitepapers/elf.html on Mar. 27, 2001.

* cited by examiner

*Primary Examiner*—Steven P. Sax
(74) *Attorney, Agent, or Firm*—Synnestvedt & Lechner LLP; Stephen Calogero, Esq.

(57) ABSTRACT

The present invention is a method for automatically determining a user identification (user ID) display field and a password display field during a logon process. The present invention comprises identifying the password display field based on a characteristic associated with the password display field and then identifying the location of the user ID display field based on a predetermined relationship to the identified password display field.

23 Claims, 5 Drawing Sheets

USER IDENTIFICATION AND PASSWORD FIELD DETERMINATION

FIELD OF THE INVENTION

The present invention relates to computer systems and, more particularly, to a method for determining the location of a user identification display field and a password display field during a logon process.

BACKGROUND OF THE INVENTION

Figure 1:
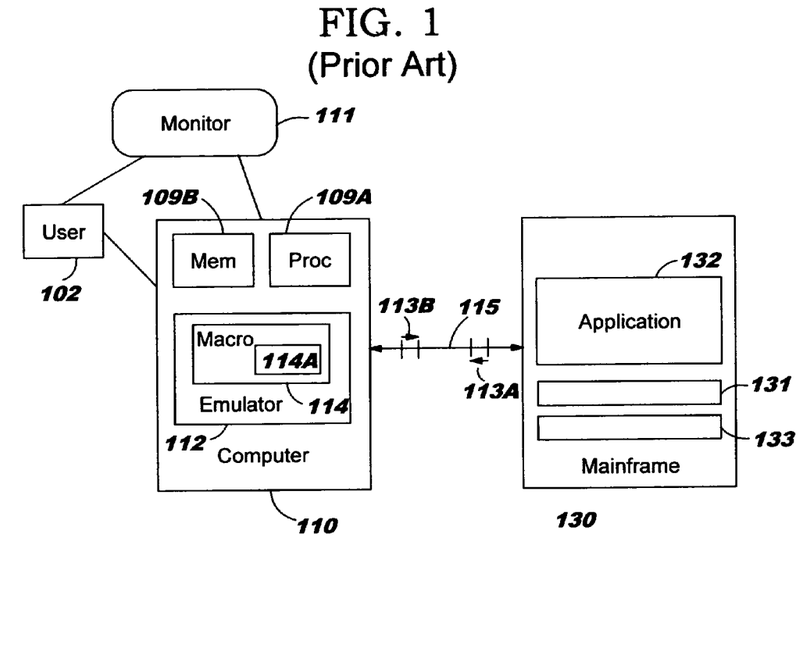
FIG. 1 is a block diagram of a prior art emulation system used in a distributed computing environment.

In present computer systems it is common for a user working on one computer to access applications residing on another computer, such as a mainframe computer, as depicted in FIG. 1. Emulation software running on a processor 109A of a user's computer 110 enables the computer 110 to communicate with the mainframe computer 130 in order to access an application 132 residing on the mainframe computer 130. The emulation software running on the processor 109A of the computer 110 is referred to as an emulator 112. For security, a user 102 supplies a user identification ("user ID") and a password to gain access to an application 132 residing on the mainframe computer 130.

Figure 1A:
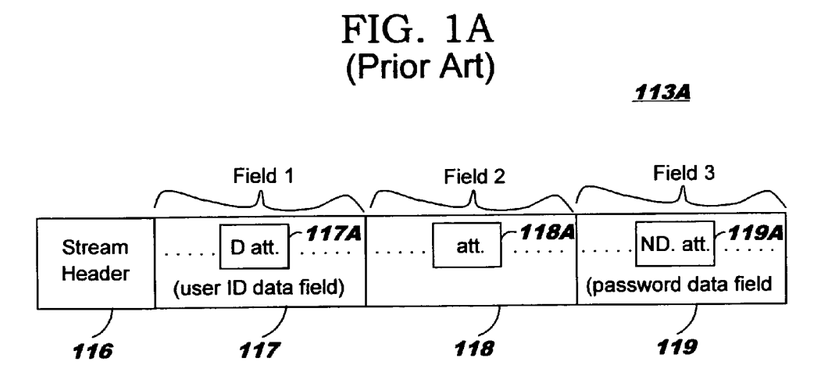
FIG. 1A is a depiction of a prior art outbound data stream used to transfer information from a host computer to a user's computer.

Information is passed between the user's computer 110 and the mainframe computer 130 over a computer network connection 115 using an outbound data stream 113A (data sent from the mainframe computer 130 to the user's computer 110) and an inbound data stream 113B (data sent from the user's computer 110 to the mainframe computer 130). FIG. 1A depicts an exemplary representation of the contents of an outbound data stream 113A. The outbound data stream 113A contains a stream header 116 and data fields 117–119. The stream header 116 contains information about the data fields 117–119 (e.g., the number of data fields which follow the stream header 116 and the number of bits in each data field) and the data fields 117–119 contain information such as user ID information residing in a user identification (ID) data field 117 and password field information residing in a password data field 119.

Figure 2A:
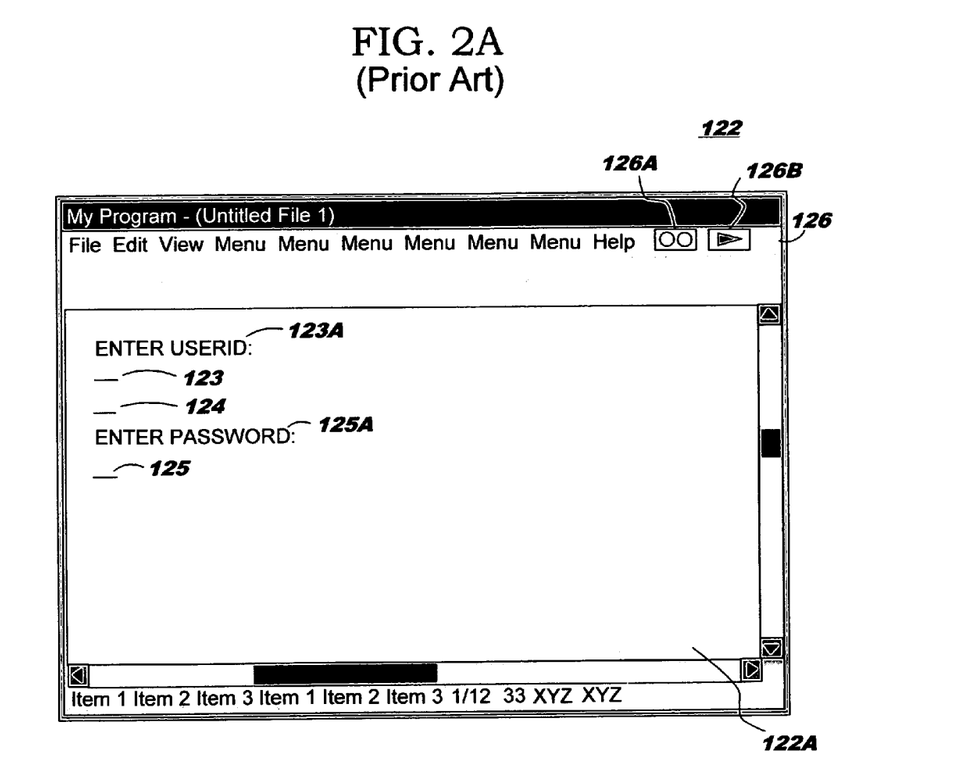
FIG. 2A is a depiction of a prior art emulator window displaying a request for a user ID and a password to be entered into a user ID display field and a password display field, respectively.

Each data field 117–119 within the outbound data stream 113A contains an attribute field 117A–119A that identifies a property or characteristic of its respective field 117–119. The user ID data field 117 and the password data field 119 contain information which is used by the emulator 112 running on the user's computer 110 to display, as depicted in FIG. 2A, a user ID display field 123 and a password display field 125, respectively, on an emulator screen 122A within an emulator window 122 for display on the user's computer monitor 111 (FIG. 1). The user 102 then supplies a user ID and a password to the mainframe computer 130 by typing character strings comprising the user ID and password into the appropriate fields of the emulator screen 122A and pressing an [ENTER] key to send the typed information to the mainframe computer 130.

One property which is often associated with the password data field 119 (FIG. 1A), which contains information for generating the password display field 125 (FIG. 2A), is a non-display attribute (ND att.) 119A that prompts the emulator 112 to not display the actual text which the user 102 types into a password display field 125. For example, if the user's password is [SUMMER] the emulator may display an asterisk (*) for each character input by a user 102 into the password display field 125 on the screen 122A, e.g., [******]. Conversely, the user ID data field 117, which contains information for generating the user ID display field 123, generally has a display attribute (D att.) 117A that prompts the emulator 112 to display the actual text which the user 102 types into the user ID display field 123.

In addition to the user ID display field 123 and the password display field 125 depicted in the emulator window 122 of FIG. 2A, the emulator screen 122A contains a user ID request 123A (e.g., ENTER USERID) and a password request 125A (e.g., ENTER PASSWORD) that identifies the user ID display field 123 and the password display field 125, respectively, for the user 102. The user 102 then supplies the user ID and the password by typing the user ID and password into the appropriate display field 123,125. Alternatively, the user ID and password are entered into display fields residing on different screens.

The user ID and password are supplied to the application 132 through the emulator 112 each time that application 132 is accessed even if the user 102 is currently using another application (e.g. application 131 or 133) on the mainframe 130 and seeks to access the application 132 at the same time. Supplying the user ID and password each time the application 132 is accessed, however, is cumbersome and often unnecessary given modern security techniques such as the secure socket layer (SSL) protocol implemented in many computer systems.

As depicted in FIG. 1, many emulators 112 contain macros 114 which can be used to supply the user ID and password for the application 132. A macro 114 permits a sequence of commands or keystrokes to be stored in a computer memory 109B and then recalled with a single command or keystroke at a later date. Often, a user 102 will store the user ID and password in a logon macro 114A to facilitate accessing the application 132. The user 102 then need only execute a single command or keystroke to supply the user ID and password to the application 132. Generally, a header 126 of the emulator window 122 (FIG. 2A) will contain a record button 126A and a play button 126B to facilitate the storage and playback of macros 114 by the emulator 112.

Storing the user ID and password in the logon macro 114A, however, leads to potential security problems. Security problems arise from the ability of persons other than the user 102 who gain access to the user's computer 110 to obtain the user ID and password of the user 102 by examining the logon macro 114A stored in the computer's memory 109B, or by executing the logon macro 114A on the user's computer 110 when the user 102 is elsewhere.

Emulation systems have been created which attempt to address the cumbersome logon process and the security issues presented by traditional macros 114 in prior art emulation systems. An example of these emulation systems are the emulation systems which support the IBM® Express Logon Feature (ELF) referred to in "Setting up and Using the IBM® Express Logon Feature,"© Copyright International Business Machines Corporation 2000, incorporated fully herein by reference.

In emulation systems incorporating ELF, security is handled by system implemented security measures such as the secure socket layer (SSL) protocol. In order to eliminate the need for the user 102 to input the user ID and password information for an application 132, a logon macro 114A must still be created; however, the user ID and password are not stored. Instead of storing the user ID and password, a logon macro 114A is created having placeholders for the user ID and password. The advanced emulation systems then rely on the system implemented security measures in a known manner to recognize the placeholders and assign the equivalent of a user ID and password which is acceptable to the application 132.

In order to replace the user ID and password with placeholders, the location of the user ID display field 123 and the password display field 125 (FIG. 2A) must first be determined so that information input into those fields can be appropriately modified for generating the logon macro 114A (FIG. 1). Identifying the user ID display field 123 and the password display field 125 requires a number of steps to be performed by the user 102 which are cumbersome and may require that the user 102 obtain special training to perform the identifying steps. Systems seeking to facilitate this process assist the user 102 in manually identifying the user ID display field 123 and the password display field 125 for the system.

Figure 2B:
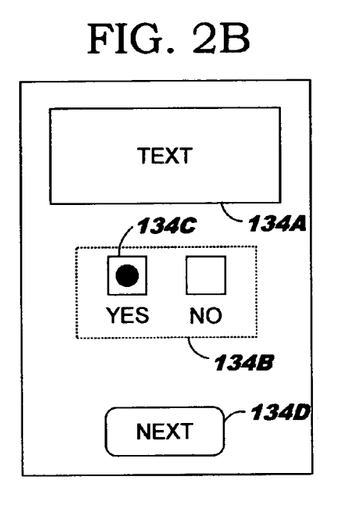
FIG. 2B is a block diagram of a related art window for determining the screen on which a user ID display field is displayed.
Figure 2C:
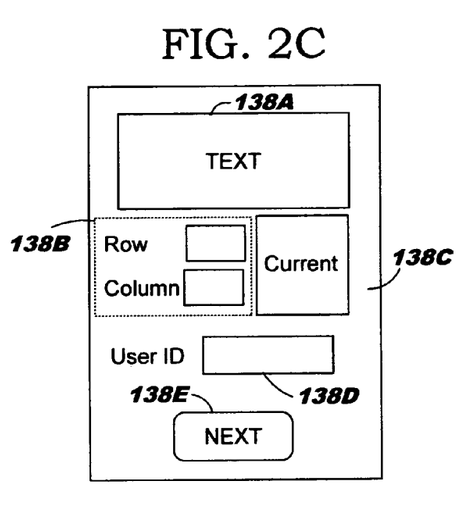
FIG. 2C is a block diagram of a related art window for determining the location of the user ID display field displayed on the screen displaying the user ID field.

One method for identifying the location of the user ID display field 123 and the password display field 125 manually involves the use of display windows, such as those displayed in FIGS. 2B and 2C, which are displayed on a monitor 111 of a user's computer 110 during the creation of a logon macro 114A. In FIG. 2B a window containing check boxes 134B and an instruction 134A stating "[d]oes this session screen contain a user ID field used to logon to the host application?," are displayed to the user 102 during the creation of a logon macro 114A. Upon encountering the screen 122A (FIG. 2A) on the monitor 111 where the user ID is requested, the user 102 selects the box labeled [YES] 134C and then selects the [NEXT] button 134D on the display window of FIG. 2B.

After selecting the [NEXT] button 134D, indicating to the system that a screen 122A containing the user ID display field 123 is displayed on a user's monitor 111, the system generates the display window depicted in FIG. 2C. The display window of FIG. 2C provides the user 102 with instructions 138A for identifying the location of the user ID display field 123 within the screen 122A. The user ID display field 123 is located in a specific location on screen 122A which may be designated by a row number and a column number. The row number and column numbers for the user ID display field 123 are then stored so that the user ID (or a user ID replacement, e.g., a placeholder) can be placed in the appropriate user ID display field 123 when the logon macro 114A is played back at a later date. In the present example, the row and column numbers are stored by inserting the row and column numbers into the appropriate boxes in a position field 138B.

The user 102 may select the [CURRENT] button 138C to propagate the row and column location of the cursor on the screen 122A into the position fields 138B. In this manner, the user 102 may cause the appropriate row and column numbers to be placed into the position fields 138B simply by placing the cursor in the first position of the user ID display field 123 (FIG. 2A) and selecting the [CURRENT] button 138C. Alternatively, the user 102 may fill in the position fields 138B manually. After the position fields 129B are filled in, the user 102 inputs the user ID into the user ID box 129D and selects the [NEXT] button 129E. This process is used to identify the screen and location of the user ID display field 123. The user 102 then follows a similar process to determine the screen and location of the password display field 125.

Present systems which attempt to identify the location of the user ID display field 123 and the password display field 125, such as the method used in recently developed emulation systems, are cumbersome for a user to learn and use, and require time and effort for training. In addition, time and effort are required for the user 102 to manually assist in identifying the locations of the user ID display field 123 and the password display field 125. Accordingly, a system which is able to automatically identify the user ID display field 123 and the password display field 125 displayed on a computer monitor 111 by an emulator 112 without intervention from the user 102 would be useful.

SUMMARY OF THE INVENTION

The present invention discloses a method for automatically determining the location a user identification (user ID) display field and a password display field displayed on a computer monitor. Generally, the present invention comprises identifying the location of the password display field based on a characteristic associated with the password display field, and then identifying the location of the user ID display field based on a predetermined relationship between the user ID display field and the identified password display field.

The automatic identification of the user ID display field and the password display field is achieved by monitoring the display fields displayed on the computer monitor, detecting a first display field based on a characteristic of that display field, and then determining a second display field with a predefined relationship to the first display field. In a preferred embodiment, the first display field is the password display field and the second display field is the user ID display field.

In a specific embodiment, the system of the present invention enables a user to create a logon macro for accessing an application located at a remote computer using a conventional logon procedure without any additional steps required to identify the location of the user ID display field and the password display field. The user ID and password display fields are determined automatically from display fields displayed on a computer monitor with the user simply logging into the application using standard screens displayed on the computer monitor. The present invention enables a user to quickly and easily create a logon macro for accessing a mainframe application without performing cumbersome steps or having to learn new procedures, thereby saving time and effort which can be used to perform other tasks.

DETAILED DESCRIPTION OF THE INVENTION

The present invention relates to a method for automatically identifying display fields displayed on a computer monitor. In a preferred embodiment of the present invention, the display field identified are a user identification (user ID) display field and the password display field. Generally, the preferred embodiment of the present invention comprises identifying the location of the password display field based on a characteristic associated with a display field and then identifying the location of the user ID display field based on a predetermined relationship to the display field identified as the password display field. The user ID and password display fields are determined automatically without requiring a user to manually perform additional steps or supply additional information.

Figure 3:
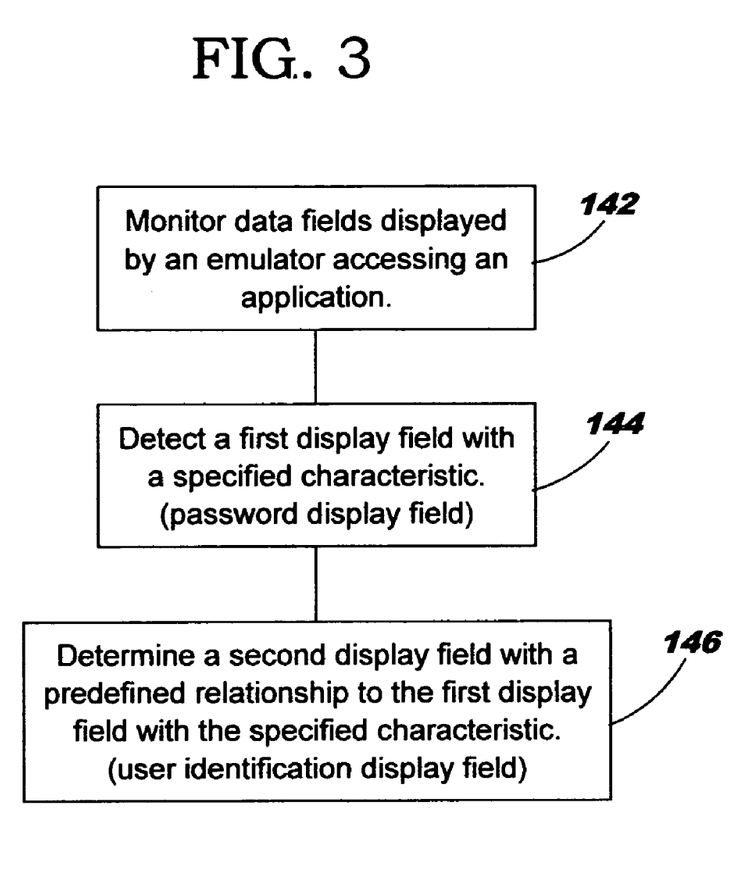
FIG. 3 is a flow chart depicting the identification of the user identification display field and the password display field in accordance with the present invention.

FIG. 3 depicts a flow chart describing the steps used to identify the user ID display field 123 and the password display field 125 (FIG. 2A) from display fields displayed on an emulator screen 122A of a computer monitor 111 (FIG. 1) in accordance with a preferred method of the present invention. For illustrative purposes, the method will be described using the emulation system depicted in FIG. 1 and the outbound data stream 113A depicted in FIG. 1A, however, the present invention can be incorporated wherever a data stream comprising information for generating a first display field with an identifiable characteristic and a second display field having a predefined relationship with the first display field is available. Suitable uses for the method of the present invention will be readily apparent to those skilled in the art. In a preferred embodiment, the steps used to identify the user ID display field 123 and the password display field 125 are stored as instructions in a memory 109B (e.g., a computer readable medium) which may be performed by a processor 109A.

Referring to FIG. 3, in step 142, display fields displayed by an emulator 112 on a computer monitor 111 are monitored as the emulator 112 accesses an application 132 stored on the mainframe computer 130. In a preferred embodiment, a computer interrupt (i.e., a signal from a program within the computer that causes a program to stop and figure out what to do next) is generated whenever a cursor is placed in a new display field, thereby prompting the emulator 112 to examine the display field containing the cursor. In alternative embodiments, every display field is examined systematically.

In step 144, the password display field 125 (FIG. 2A) is identified. The method of the present invention identifies the password display field 125 by detecting a first display field displayed on the emulator screen 122A with a specified characteristic. In certain preferred embodiments, the specified characteristic is derived from an attribute 117A–119A associated with each data field 117–119 used to generate the display fields on the emulator screen 122A. The attributes 117A–119A identify a property or characteristic of their associated data fields 117–119. In the certain preferred embodiments, the specified characteristic is a non-display attribute (ND att.) 119A indicating that data input into a display field with the non-display attribute will not be displayed on an emulator screen 122A.

Generally, an emulator will display a specific symbol, such as an "*," on an emulator screen 122A (FIG. 2A) in response to a user's keystrokes input to a non-display attribute field regardless of the actual keystrokes typed by the user 102. Typically, the first display field having a non-display attribute which a cursor is positioned in is the password display field 125; assuming this to be the case, identifying the first display field having a non-display attribute also identifies that display field as the password display field 125.

Although the specified characteristic mentioned above is the existence of a non-display attribute, it is understood that the specified characteristic may be any feature associated with the display field generated from the data fields 117–119 which could be used to identify the password display field 125. By detecting the password display field 125 in the above-described manner, the password display field 125 can be detected without requiring additional input from the user 102 to identify a screen 122A displaying the password display field 125 and the location of the password display field 125 on that screen 122A.

In step 146, the user ID display field 123 (FIG. 2A) is identified. In accordance with the present invention, the user ID display field 123 is identified by its relationship to the display field with the specified characteristic (i.e., the password display field 125). Typically, the first non-empty display field (e.g., a display field containing data input by a user 102 such as the user ID display field 123) preceding the password display field is the user ID display field 123.

For illustrative purposes, data field 118 generates an empty display field (i.e., data is not input into the display field), therefore, in this example, the first non-empty display field preceding the password display field 125 is the user ID display field 123. Obviously, other predefined relationships may be used to determine the user ID display field 123 depending on the system with which the method of the present invention is used. For example, the predefined relationship may be simply the display field immediately preceding the password display field 125 (i.e., display field 124 in this example) regardless of the content of that display field. Alternatively, the predefined relationship may be the third display field preceding/following the password display field 125; the third non-empty display field preceding/following the password display field 125; etc.

In a preferred embodiment, every time a cursor is positioned in a non-empty display field that field is stored as a potential user ID field in a memory 109B. If the next field the cursor is positioned in is the password display field 125, the stored field is identified as the user ID display field 123. If the next field the cursor is positioned in is not the password display field 125, the new field in which the cursor is positioned becomes the potential user ID field, etc. In an alternative embodiment, all of the display fields in which the cursor is positioned are stored in the memory 109B until the password display field 125 is identified. The system then examines the memory address preceding the memory address of the password display field 125 to ascertain the user ID display field 123.

As long as there is either a uniform standard used in the system (e.g., the user ID display field 123 is always a predetermined number of display fields before or after the password display field 125) or the user ID display field 123 is determinable by sensing a characteristic about it (e.g., the user ID display field 123 is the first non-empty display field before or after the password display field 125), then the method of the present invention may be practiced. Accordingly, the user ID display field 123 can be detected without requiring additional input from the user 102 to identify a screen displaying the user ID display field 123 and the location of the user ID display field 123 on that screen.

Figure 4:
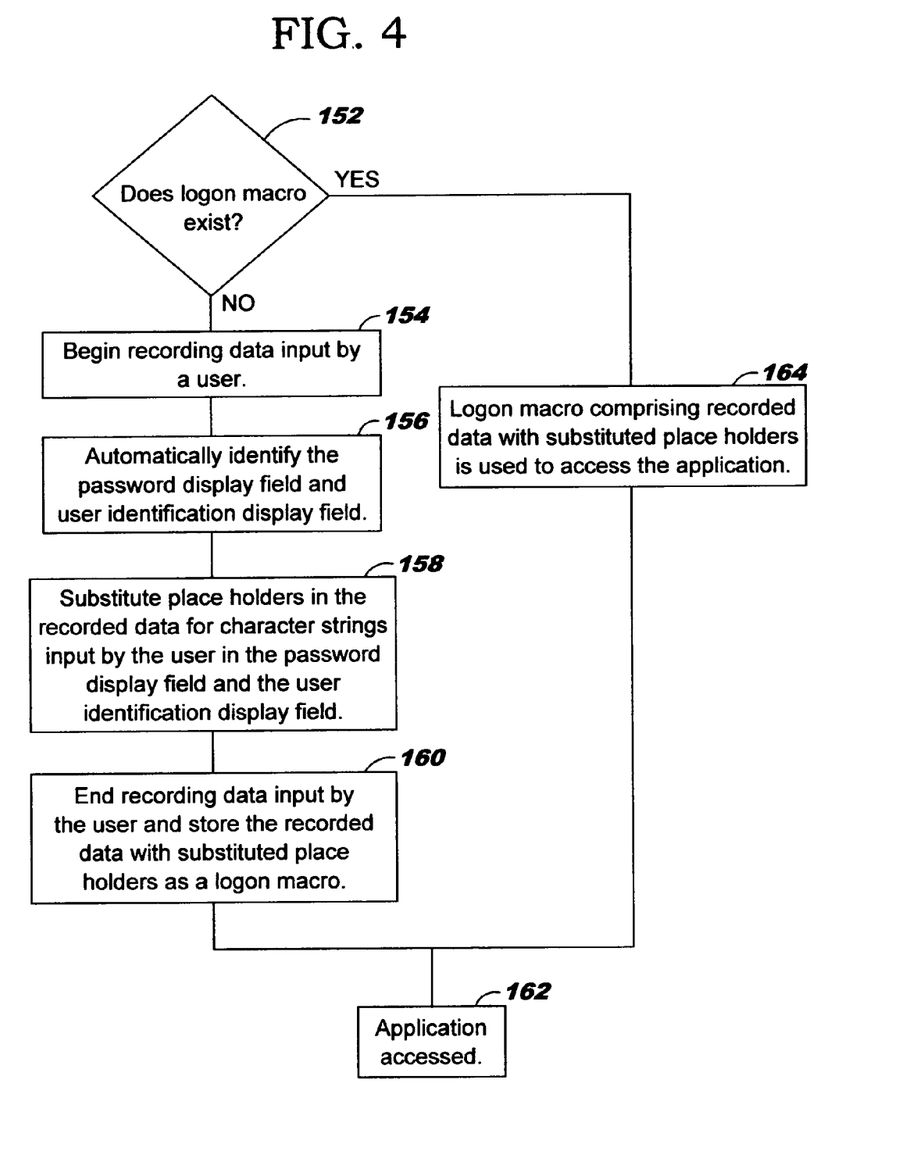
FIG. 4 is a flow chart of a macro incorporating the automatic identification of a password display field and user identification display field in accordance with the present invention.

The automatic identification of the user ID display field 123 and the password display field 125 as described in the description of FIG. 3 can be used to create a logon macro 114A in an emulation system (FIG. 1). FIG. 4 depicts a flow chart describing the creation of the logon macro 114A and the use of the logon macro 114A in an emulator 112. The logon macro 114A is created for logging onto an application 132 residing on a mainframe computer 130.

In step 152, it is determined if a logon macro 114A exists for accessing an application 132. In a preferred embodiment, a system administrator or an individual user 102 developing the logon macro 114A would make this determination. If it is determined that a logon macro 114A for accessing the application 132 does not exist the processing proceeds to step 154.

In step 154, data (e.g., keystrokes) input by a user 102 is recorded. During the creation of the logon macro 114A (e.g., an initial logon to the application132), the user 102 inputs the user ID and password into a user ID display field 123 and a password display field 125 (FIG. 2A), respectively, as if accessing the application 132 without creating a macro 114.

In step 156, the user ID display field 123 and the password display field 125 are automatically identified using the steps described in the description of FIG. 3 of the present invention.

In step 158, placeholders are substituted for the character strings input by the user 102 into the password display field 125 and the user ID display field 123 (i.e., the user ID and password). Preferably, the placeholders are substituted during the recording of the logon macro 114A. Alternatively, the substitution can take place after the logon macro 114A is recorded.

In step 160, the recording is finished and the recording containing the recorded keystrokes with the substituted placeholders is stored as a logon macro 114A. The application 132 is then accessed in step 162.

If it is determined that a logon macro 114A for accessing the application 132 does exist, the processing proceeds to step 164. In step 164, the logon macro 114A, comprising the recorded keystrokes input by the user 102 with the substituted placeholders, is used to access the application 132. Additional software programs running within the system identify the placeholders and assign secure logon information for accessing the application 132. The application 132 is then accessed in step 162 as described above.

In a practical application of the method depicted in FIG. 4, a system administrator first creates a logon macro 114A to logon to an application 132 and then distributes the logon macro 114A to end users. During the recording of the logon macro 114A, the user ID display field 123 and password display field 125 are identified so that the placeholders can be substituted into the logon macro 114A for the values input into these fields by the administrator. During subsequent logons by the end users, the logon macro 114A with the placeholders is used with security handled by a secure socket layer (SSL). During playback of the logon macro 114A by the end users, the placeholders in the macro are sent to a server residing between the user's computer 110 and the mainframe 130. The server scans for the placeholders and replaces them with values acceptable to the application 132. The placeholders can be any predefined character string that the server is programmed to recognize.

Although the present invention has been described in terms of identifying a user ID display field and a password display field, the present invention can be used to identify essentially any display fields in which a first display field has a distinguishing characteristic and a second display field has a predefined relationship to the first display field. For example, the present invention could be used to identify a credit card number display field and a credit card expiration date display field. Other applications for which the present invention may be used will be readily apparent to those skilled in the art.

Having thus described a few particular embodiments of the invention, various alterations, modifications, and improvements will readily occur to those skilled in the art. For example, the present invention has been described for use with an emulator system, however, the present invention can be used with any system containing data which generates display fields with unique attributes and characteristics for receiving logon information. In addition, the invention has been described with the user ID display field and the password field residing on the same screen, however, the user ID display field and password field may be displayed on different screens as long as a relationship between the display fields can be ascertained. Also, the method of the present invention can be stored as instructions on a computer-readable medium which may be performed by a processor. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for automatically determining, from a plurality of text entry fields displayed on a computer monitor, the locations of at least two text entry fields having a predefined relationship with each other for the purpose of facilitating a system logan process, the method comprising:
automatically identifying a first text entry field from among the plurality of text entry fields displayed on said computer monitor, said identifying said first text entry field being performed by identifying one of the plurality of text entry fields that has a predetermined text entry characteristic, said first display field having a first location; and
automatically identifying a second text entry field from among a remainder of the plurality of text entry fields displayed on said computer monitor in response to automatically identifying said first text entry field, said identifying said second text entry field being performed based on a predefined relationship between a respective location of the second display field and the identified first location of the first display field.

2. The method of claim 1, wherein the first text entry field is a password text entry field and the second text entry field is a user identification text entry field associated with said password text entry field.

3. The method of claim 1, wherein automatically identifying the first text entry field comprises monitoring text entry fields displayed on the computer monitor at least until a text entry field having the predetermined text entry characteristic is encountered.

4. The method of claim 3, wherein the predetermined text entry characteristic is a non-display attribute.

5. The method of claim 4, wherein an emulator generates text entry fields on the computer monitor and monitoring text entry fields displayed on the computer monitor at least until a text entry field having the predetermined text entry characteristic is encountered comprises examining a new text entry field in response to an interrupt generated by said emulator when a cursor is positioned within said new text entry field.

6. The method of claim 1, wherein identifying the second text entry field comprises monitoring the text entry fields displayed on the computer monitor and determining which text entry field has the predefined relationship with the first text entry field.

7. The method of claim 6, wherein an emulator generates text entry fields on the computer monitor and monitoring text entry fields displayed on the computer monitor at least until a text entry field having the predetermined text entry characteristic is encountered comprises examining a new text entry field in response to an interrupt generated by said emulator when a cursor is positioned within said new text entry field.

8. The method of claim 6, wherein said predefined relationship between the second text entry field and the first text entry field is that the second text entry field is the first non-empty text entry field preceding the first text entry field.

9. The method of claim 6, wherein the predefined relationship is that the second text entry field is positioned a predetermined number of text entry fields from the first text entry field.

10. The method of claim 6, wherein said predefined relationship is that the second text entry field is positioned a predetermined number of non-empty text entry fields from the first text entry field.

11. A system for identifying text entry fields displayed on a computer monitor for the purpose of facilitating a system logon process, said system comprising a processor and instruction stored on a computer-readable medium, said instruction when performed by said processor cause said system to:
automatically identifying a first text entry field from among the plurality of text entry fields displayed on the computer monitor, said identifying said first text entry field being performed by identifying one of the plurality of text entry fields that has a predetermined text entry characteristic, said first display field having a first location; and
automatically identifying a second text entry field from among a remainder of the plurality of text entry fields displayed on the computer monitor in response to automatically identifying said first text entry field, said identifying said second text entry field being performed based on a predefined relationship between a respective location of said second text entry field and said identified first location of the first text entry field.

12. The system of claim 11, wherein automatically identifying said first text entry field having said characteristic comprises monitoring text entry fields displayed on the computer monitor at least until a text entry field having said characteristic is encountered.

13. The system of claim 12, wherein said characteristic is a non-display attribute.

14. The system medium of claim 11, wherein identifying said second text entry field comprises monitoring the text entry fields displayed on the computer monitor and determining which text entry field has said predefined relationship with said first text entry field.

15. The system of claim 14, wherein said predefined relationship between said second text entry field and said first text entry field is that said second text entry field is the first non-empty text entry field preceding said first text entry field.

16. A method for creating a logon macro from data input into text entry fields displayed on a computer monitor by an emulator for accessing an application, the method comprising:
automatically recording data input into text entry fields displayed on the computer monitor;
automatically identifying a first text entry field from among a plurality of text entry fields displayed on the computer monitor, said identifying said first text entry field being performed by identifying one of the plurality of text entry fields that has a predetermined characteristic of said first text entry field, said first text entry field receiving a first character string as input data and having a first location;
automatically substituting a first placeholder for said first character string in the recorded input data;
automatically identifying a second text entry field from among a remainder of the plurality of text entry fields displayed on the computer monitor in response to automatically identifying said first text entry field, said identifying said second text entry field being performed based on a predetermined relationship between a respective location of said second text entry field and said identified first location of said first text entry field, said second text entry field receiving a second character string as input data; and
automatically substituting a second placeholder for said second character string in the recorded input data.

17. The method of claim 16, wherein automatically identifying said first text entry field comprises monitoring the text entry fields generated by the emulator on the computer monitor during a logon process at least until a text entry field having said characteristics is encountered.

18. The method of claim 17, wherein said predetermined characteristic of said first text entry field is that it has a non-display attribute.

19. The method of claim 16, wherein said predefined relationship between said second text entry field and said first text entry field is that said second text entry field is the first non-empty text entry field preceding said first text entry field.

20. The method of claim 17, wherein automatically identifying said second text entry field comprises monitoring the text entry field generated by the emulator on the computer monitor during a logon process and detecting the first non-empty text entry field preceding said first text entry field.

21. The method of claim 16, wherein said first text entry field is a password text entry field and said second text entry field is a user identification text entry field.

22. The method of claim 16, wherein automatically substituting said first placeholder and said second placeholder in the recorded data streams occur during the recording of the data input into a text entry field.

23. The method of claim 16, wherein automatically substituting said first placeholder and said second placeholder in the recorded data streams occur after the recording of the data input into text entry fields is complete.

* * * * *

UNITED STATES PATENT AND TRADEMARK OFFICE
CERTIFICATE OF CORRECTION

PATENT NO. : 7,003,727 B2  
APPLICATION NO. : 09/777287  
DATED : February 21, 2006  
INVENTOR(S) : Rosar

It is certified that error appears in the above-identified patent and that said Letters Patent is hereby corrected as shown below:

Column 8,
Line 31, change "logan" to -- logon --.

Column 10,
Line 43, change "17" to -- 19 --.

Signed and Sealed this

Twentieth Day of June, 2006

JON W. DUDAS  
*Director of the United States Patent and Trademark Office*